UNITED STATES PATENT OFFICE.

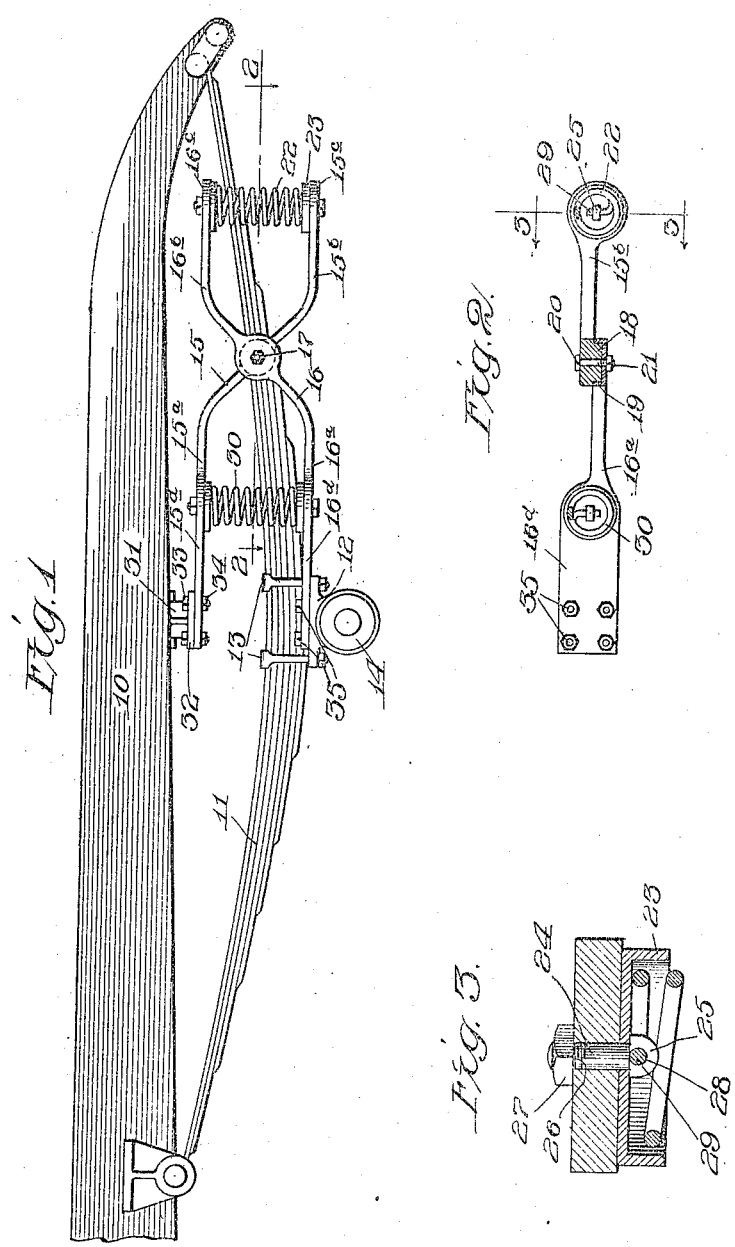

FRED PATEE, OF CHICAGO, ILLINOIS.

SHOCK-ABSORBER.

1,305,004. Specification of Letters Patent. Patented May 27, 1919.

Application filed June 25, 1914. Serial No. 847,200.

*To all whom it may concern:*

Be it known that I, FRED PATEE, a citizen of the United States, residing at Chicago, in the county of Cook and State of Illinois, have invented certain new and useful Improvements in Shock-Absorbers, of which the following is a specification.

This invention relates to improvements in shock absorbers and has for its object to provide a simple and efficient device adapted to reduce the shocks and vibrations incident to the passage of a vehicle over rough or bumpy ground. It will be obvious that my invention may be applied to a large number of other purposes where a similar effect is to be accomplished. The particular features and advantages of my device will be made apparent in the following specification when taken in connection with the drawings, in which—

Figure 1 shows a portion of an automobile with my device applied thereto;

Fig. 2 shows a sectional view taken along the line 2—2 of Fig. 1 looking in the direction of the arrows, a part of my device appearing in plan.

Fig. 3 is a sectional view taken along the line 3—3 of Fig. 2 showing the spring-seat and associated parts with a portion of the spring broken away.

Like numerals refer to like parts and elements in the several figures of the drawings, in which 10 designates a part of the side frame of an automobile supported by the spring 11 which rests on the spring clip plate 12 and is secured thereto by the spring clips 13. The axle of the automobile on which the spring clip plate 12 and various other parts of the automobile are mounted is designated by the numeral 14. All of these parts are such as may be found in an ordinary automobile and they merely form a basis for showing one adaptation of my invention, which will now be described.

My invention comprises two principal members 15 and 16 pivoted on each other at point 17 thereby forming the pairs of offset lever arms 15ª, 15ᵇ, 16ª and 16ᵇ. At the pivotal point a lug 18 may be formed on the member 15 adapted to fit in a socket 19 formed on the member 16 and the two parts may be secured together by bolt 20 and a nut 21 thus forming an ordinary sleeve bearing.

Extending between the enlarged portions 15ᶜ and 16ᶜ of the lever arms 15ᵇ and 16ᵇ, I provide an extensible and compressible spring 22 which is fixed at each end in a spring-seat 23 of cup-like form, as shown in Fig. 3. Each valve seat 23 is secured to the lever arm by which it is carried by means of a bolt 24 having a head 25, which engages the spring-seat, and a threaded portion 26 engaged by nut 27. The head 25 is apertured at 28 to receive a diametrically disposed portion 29 of the spring, whereby each end of the spring is held in fixed relation to its corresponding lever arm.

I preferably also provide an extensible and compressible spring 30 between the enlarged portions 15ᵈ and 16ᵈ of the lever arms 15ª and 16ª, this spring being in all respects similar to, and secured in the same manner as spring 22, above described.

A portion of the side frame 10 carries an angle plate 31 having a horizontally disposed portion 32. Portion 15ᵈ of the lever arm 15ª is apertured to receive bolts 33 which engage corresponding apertures in the horizontally disposed portion 32. The bolts 33 are engaged by nuts 34 thus securing the lever arm 15ª rigidly to the member 31. The spring clip plate 12 has threaded apertures therein which are engaged by studs 35 passing through corresponding apertures in the portion 16ᵈ of the lever arm 16ª, thus rigidly securing the lever arm 16ª in fixed relation to the axle of the automobile.

The operation of my device is as follows:—

In the passage of the automobile over a rough or bumpy surface, the first tendency of the frame 10 when passing over a bump is to move toward the axle 14. This movement will be resisted by the compression of the two springs 22 and 30 and also by the spring 11. Immediately after such compression takes place the tendency is for the frame 10 to move upwardly away from the axle 14 thereby tending to throw the occupants of the automobile from their seats. As the frame 10 moves upwardly, however, the lever arms of my device will spread apart thereby putting the springs 22 and 30 in tension and resisting such movement of the automobile frame.

I preferably provide the springs 22 and 30 under a considerable tension when the frame 10 is in its normal position in relation to the axle 14 so that the movement of the frame toward the axle will not compress the springs 22 and 30, but will allow them to relax to their normal position, the movement of the frame toward the axle being resisted only by the spring 11 of the automobile. I do this in order that when the frame 10 begins to move away from the axle 14, there will be no tendency in the springs 22 and 30 to force the lever arms apart thereby increasing the force tending to move said frame in an upwardly direction.

It is obvious that either one of the springs 22 and 30 may be omitted from the structure, a change in the number of springs merely affecting the efficiency of my device.

I have specifically described my invention as applied to an automobile, fulfilling the function of a shock absorber, but it will be apparent that by changing the lengths of the lever arms and the proportions of the various other parts, that my device may be applied to a large number of uses where a similar purpose is to be effected, and I do not wish to be limited to the particular showing and description beyond the scope of the following claims.

I claim:

1. In a device of the class described, a lever having one end rigidly secured to the axle of a vehicle; a second lever having one end rigidly secured to the body of the vehicle adjacent said axle, said levers being crossed at a point between their extremities and pivoted at said point of intersection, and coil springs located on each side of said pivotal point and having their extremities secured to said levers, said springs being normally under tension, whereby when said body moves toward said axle said springs will be relaxed while movement of the body away from said axle will operate to put said springs under tension.

2. A shock absorber comprising two levers pivotally connected to each other and arranged to be attached to the body and the axle of a vehicle respectively, and a spring extending between said arms and connected thereto, said spring being normally under tension to permit said body to move toward said axle without compressing said spring.

3. In a device of the class described, a lever arm having one end attached to the axle of a vehicle; a second lever arm having one end attached to the body of the vehicle above said axle, said lever arms being pivoted on each other at a point of intersection intermediate their ends, and compressible and extensible springs extending between said lever arms on each side of said pivotal point, said springs being normally under tension, whereby movement of the body of said vehicle away from the axle thereof is resisted.

In testimony whereof, I have subscribed my name.

FRED PATEE.

Witnesses:
 EDYTHE M. ANDERSON,
 MAURICE BOLTON.

Copies of this patent may be obtained for five cents each, by addressing the "Commissioner of Patents, Washington, D. C."